UNITED STATES PATENT OFFICE.

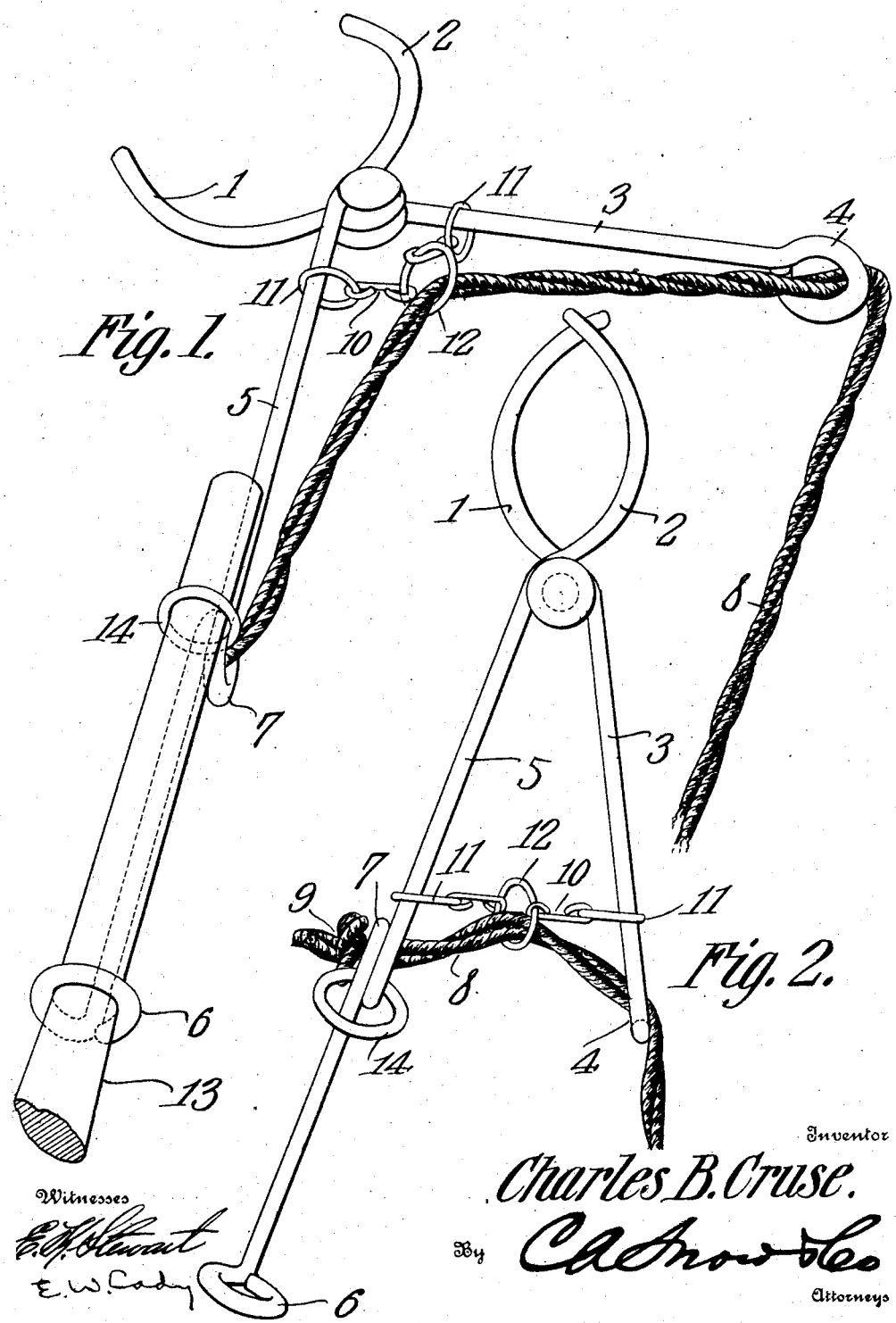

CHARLES B. CRUSE, OF PERKINS, OKLAHOMA.

ANIMAL-CATCHER.

No. 902,057.   Specification of Letters Patent.   Patented Oct. 27, 1908.

Application filed June 6, 1908. Serial No. 437,169.

*To all whom it may concern:*

Be it known that I, CHARLES B. CRUSE, a citizen of the United States, residing at Perkins, in the county of Payne and State of Oklahoma, have invented a new and useful Animal-Catcher, of which the following is a specification.

This invention relates to grappling tongs for catching live stock and poultry, and has for its object to provide an improved device of this kind which will firmly hold the animal when caught and will prevent the catching device from becoming disengaged.

The invention consists of an animal catching grappling device constructed as hereinafter set forth and claimed.

Referring to the drawing:—Figure 1 is a view of the invention showing it in position for use. Fig. 2 is a view thereof showing the jaws closed.

In carrying out the invention the animal catching device is constructed with a pair of curved pivoted jaws 1, and 2, the jaw 1 having a short operating arm 3 terminating in a loop or ring 4, and the jaw 2 having an extended arm 5 terminating in a loop or ring 6 projecting laterally from the arm 5, and a loop or ring 7 between its ends opposite the ring 4, when the arms 3 and 5 are in closed position.

To operate the catching device a cord 8 of suitable length and here shown as doubled, is secured at one end to the ring 7 by a knot 9 or in any other suitable manner, and extends through the ring 4. It will readily be seen that by pulling on the free end of cord 8 the arm 3 will be drawn towards the arm 5, thereby bringing the jaws 1 and 2 to the closed position shown in Fig. 2. To aid in operating the catching device, and bring the jaws 1, and 2 to closed position and also to hold and lock said jaws in closed position, a suitable device therefor is provided, preferably consisting of a length of chain 10 with enlarged links or rings 11 at its ends mounted on the arms 3 and 5, and an enlarged link or ring 12 between its ends through which extends the cord 8. In using the catching device it is mounted on a rod or pole 13 the end of which extends through the ring 6, and ring 14, or other suitable engaging device mounted on the arm 5 at the ring 7. The catching device being in the position shown in Fig. 1 with the jaws 1 and 2 distended, the chain 10 will be located adjacent to the pivotal point of the jaws. The catching device is then held by means of pole 13 against the leg of the animal to be caught and the jaws 1 and 2 are quickly closed about the leg of the animal by pulling on cord 8 which draws arm 3 to the position shown in Fig. 2. In pulling on cord 8 it acts on chain 10 to draw it along the arms 3 and 5 to the position thereon shown in Fig. 2, the pulling on chain 10 causing it to draw the arms 3 and 5 towards each other, thus aiding in the drawing of the arm 3 towards arm 5 by the pull of cord 8 on the end of arm 3. When the animal is caught, the pole 13 may be detached from the catching device by pulling it out of rings 6 and 14, and the animal held by the cord 8 and the catching device. When so held the catching device cannot become disengaged from the animal's leg, as the chain 10 prevents the arms 3 and 5 from being drawn away from each other and practically locks the jaws 1, and 2 to the animal's leg.

Having described the invention, I claim:—

1. An animal catching device consisting of grappling tongs with pivoted curved jaws and foldable arms; a cord connected to one of said arms and slidably extending through the other, and a flexible connection between said arms, slidable thereon, and connected with said cord.

2. An animal catching device consisting of grappling tongs with pivoted curved jaws, one having a short arm and the other an extended arm, said arms being foldable together; a chain connecting said arms and slidable thereon; a cord connected to the extended arm and slidably connected with said chain, and slidably extending through the short arm; and a pole detachably connected with the extended arm.

In testimony that I claim the foregoing as my own, I have hereto affixed my signature in the presence of two witnesses.

CHARLES B. CRUSE.

Witnesses:
 H. J. FIELDS,
 J. C. CARLILE.